(12) United States Patent
Han et al.

(10) Patent No.: US 11,101,858 B2
(45) Date of Patent: Aug. 24, 2021

(54) AUTOMATICALLY SELECT CODEBOOK

(71) Applicant: Hewlett Packard Enterprise Development LP, Houston, TX (US)

(72) Inventors: Jianpo Han, Beijing (CN); Qiang Zhou, Beijing (CN); Guangzhi Ran, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 65 days.

(21) Appl. No.: 16/653,117

(22) Filed: Oct. 15, 2019

(65) Prior Publication Data

US 2020/0127716 A1   Apr. 23, 2020

(30) Foreign Application Priority Data

Oct. 18, 2018 (CN) .......................... 201811214307.6

(51) Int. Cl.
*H04B 7/06* (2006.01)
*H04B 17/318* (2015.01)

(52) U.S. Cl.
CPC ......... *H04B 7/0608* (2013.01); *H04B 17/318* (2015.01)

(58) Field of Classification Search
CPC .. H04B 7/0608; H04B 17/318; H04B 7/0628; H04B 7/0456; H04B 7/0408;
(Continued)

(56) References Cited

U.S. PATENT DOCUMENTS 8,781,019 B2   7/2014 Kim
9,019,845 B2   4/2015 Prakash et al.
(Continued)

FOREIGN PATENT DOCUMENTS

WO   WO-2016015307 A1   2/2016

OTHER PUBLICATIONS

Li, Jingyu, et al. "Codebook design for uniform rectangular arrays of massive antennas." 2013 IEEE 77th vehicular technology conference (VTC Spring). IEEE, 2013. (Year: 2013).*
(Continued)

*Primary Examiner* — Sharad Rampuria
(74) *Attorney, Agent, or Firm* — Hewlett Packard Enterprise Patent Department

(57) ABSTRACT

A network device may comprise a plurality of antennas; a processor; and a non-transitory computer readable medium storing a plurality of codebooks, each of the plurality of codebooks comprising instructions to test communication capabilities of the network device using a particular configuration of the plurality of antennas, in response to a first boot of the network device, the processor causing the network device to: load a first codebook of the plurality of codebooks; test the particular configuration of the plurality of antennas associated with the first codebook; store a first result comprising the communication capability of the first codebook; load a second codebook of the plurality of codebooks; test the particular configuration of the plurality of antennas associated with the second codebook; store a second result comprising the communication capability of the second codebook; and select the first codebook or the second codebook based on the first result or the second result.

20 Claims, 6 Drawing Sheets

(58) Field of Classification Search
CPC ........ H04B 7/0639; H04B 3/46; H04B 17/00; H04L 43/00; H04L 43/50; H04W 24/00
See application file for complete search history.

(56) References Cited

U.S. PATENT DOCUMENTS

| | | |
|---|---|---|
| 9,136,974 B2 | 9/2015 | Gorokhov et al. |
| 9,698,887 B2 | 7/2017 | Geirhofer et al. |
| 2009/0189812 A1* | 7/2009 | Xia ................... H04B 17/24 342/374 |
| 2018/0013471 A1 | 1/2018 | Gao |

OTHER PUBLICATIONS

Parvez, Imtiaz, Farhan Abdul, and Arif I. Sarwat. "A location based key management system for advanced metering infrastructure of smart grid." 2016 IEEE Green Technologies Conference (GreenTech). IEEE, 2016 (Year: 2016).*

Chen et al, A Joint Codebook Design for Beamforming Systems with Transmit Antenna Selection, IEEE ICC 2011 proceedings, Jun. 5-9, 2011, 5 Pgs.

* cited by examiner

500

Receive coordinate information from a GPS module
501 determine relative positions of the network device with respect to other network devices based on the coordinate information
502 the network device may select a codebook based on the coordinate information
503

FIG. 5

AUTOMATICALLY SELECT CODEBOOK

BACKGROUND

A network device, such as such as an 802.11 ad access point (AP) working on microwave band, has massive antenna array consisting of a plurality of antennas, and codebooks of the network device is used to define a particular configuration of the plurality of antennas, such as a number of sectors, a number of antennas in each sector, beam direction, and beam width. Generally, a codebook is generated during manufactory stage according to antenna feature requirement, and stored in board data file of the network device. The codebook is loaded after the network device boots, and is not changed dynamically.

BRIEF DESCRIPTION OF THE DRAWINGS

FIG. 5 is a flowchart of selecting a codebook based on the relative positions of the APs.

DETAILED DESCRIPTION

Figure 1:
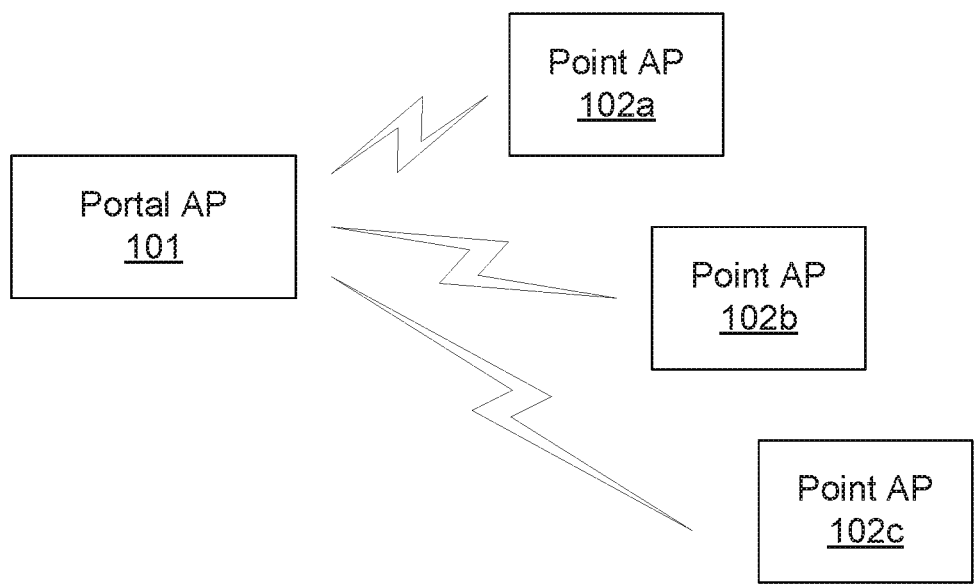
FIG. 1 is a topological graph illustrating an example network system according to present disclosure.

A network device, for example IEEE 802.11ad outdoor AP, may be configured with a coverage of a horizontal angle rang and a vertical angle rang, such as a horizontal angle from positive 45 degree to negative 45 degree and a vertical angle from positive 15 degree to negative 15 degree, (i.e., +/−45° H and +/−15° V coverage), and the network device may also be configured with a long distance. A codebook with wider coverage may work in all scenarios and may be at the cost of distance; also an codebook with narrow beam and less sectors may boost range and may work in a specific scenario.

Massive antenna array and beamforming may be used to compensate higher attenuation in 60 Ghz band. A network device with more antennas and narrower beam may focus energy to a certain direction and benefit Received Signal Strength Indicator (RSSI). In practice, different scenarios may have different antenna configuration, such as vertical coverage, horizontal coverage, a number of sectors, beam width of each sector, and antenna gain of each sector.

After the network device boots, if a loaded codebook is not suitable for the current scenario, it may not maximize antenna performance. In addition, if antenna alignment is implemented strictly and the codebook is manually selected when installing the network device, it may increase complexity and time of installation even though the selected codebook is suitable for the current scenario.

If a codebook which may be suitable for the current scenario is selected automatically when the network device boots, antenna performance may be maximized, and the installation of the network device may become simple, easy and reliable. For this, the invention provides a network device, method and non-transitory computer readable storage medium to achieve this target.

In one example, a network device comprising: a plurality of antennas; a processor; and a non-transitory computer readable medium storing a plurality of codebooks, each of the plurality of codebooks comprising instructions to test communication capabilities of the network device using a particular configuration of the plurality of antennas, in response to a first boot of the network device, the processor causing the network device to: load a first codebook of the plurality of codebooks; test the particular configuration of the plurality of antennas associated with the first codebook; store a first result comprising the communication capability of the first codebook; load a second codebook of the plurality of codebooks.

In another example, a method of selecting a codebook from a network device storing a plurality of codebooks, wherein the network device comprises a plurality of antennas and a particular configuration of the plurality of antennas is used to test communication capabilities of the network device, the method including: loading a first codebook of the plurality of codebooks in response to a first boot of the network device; testing the particular configuration of the plurality of antennas associated with the first codebook; storing a first result comprising the communication capability of the first codebook; loading a second codebook of the plurality of codebooks; testing the particular configuration of the plurality of antennas associated with the second codebook; storing a second result comprising the communication capability of the second codebook; selecting the first codebook or the second codebook based on the first result or the second result.

In yet another example, a non-transitory computer readable storage medium storing a plurality of codebooks, each of the plurality of codebooks comprising instructions to test communication capabilities of a network device using a particular configuration of the plurality of antennas, the instructions that; when executed by a processor of the network device, causes the processor to; load a first codebook of the plurality of codebooks in response to a first boot of the network device; test the particular configuration of the plurality of antennas associated with the first codebook; store a first result comprising the communication capability of the first codebook; load a second codebook of the plurality of codebooks; test the particular configuration of the plurality of antennas associated with the second codebook; store a second result comprising the communication capability of the second codebook; select the first codebook or the second codebook based on the first result or the second result.

As used herein, a "network device" generally may include a device that may be adapted to transmit and/or receive signaling and to process information within such signaling and to provide wireless local area network services to a station (e.g., any data processing equipment such as a computer; cellular phone, personal digital assistant, tablet devices, etc.). The "network device" may refer to a wireless device working on microwave band and include access points, data transfer devices, network switches, routers, controllers, etc. As used herein, an "access point" (AP) generally may refer to receiving points for any known or convenient wireless access technology which may later become known. Specifically, the term AP is not intended to be limited to IEEE 802.11-based APs. APs generally may function as an electronic device that is adapted to allow wireless devices to connect to a wired network via various communications standards.

Moreover, as used herein, an AP may include a point AP and a portal AP. The point AP generally may refer to a client mode AP, and the portal AP generally may refer to an AP which bridges between point APs. The client may be a smartphone, a mobile phone, a Personal Digital Assistant (FDA), a portable personal computer, a notebook, a tablet, a desktop computer, a multimedia player, or any other computing device capable of communicating with other wireless devices via the wireless network.

It is appreciated that examples described herein below may include various components and features. Some of the components and features may be removed and/or modified without departing from a scope of the device, method and non-transitory computer readable storage medium for. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a topological graph illustrating an example network system 100 according to present disclosure. In this example, APs may be adopted as network devices. Moreover, the invention is not limited thereto, and other devices, such as network switches, routers, controllers, and repeaters, may be used as network devices.

Referring to FIG. 1, the example network system 100 may include a portal AP 101, an point AP 102$a$, an point AP 102$b$, and an point AP 102$c$, Hereinafter, the point AP 102$a$, the point AP 102$b$, and the point AP 102$c$ are collectively referred to as the point AP 102. The point AP 102 may directly communicate with a client (not shown) via a wireless network. The portal AP 101 and the point AP 102 may be network switches, routers, controllers, and repeaters. Although three point APs are shown in FIG. 1, the number of the point APs is not limited thereto.

Both the portal AP 101 and the point AP 102 may include a memory and a processor. The memory in each AP may save a board data file including a plurality of codebooks.

The particular configuration of the plurality of antennas in the every codebook in each AP may be determined by the way of: dividing the coverage of the antenna into different groups according to antenna requirements; then, for each divided group, generating and aligning codebooks; and next, during manufactory stage, saving codebooks to the board data file in the memory of the AP.

The coverage of the antenna may be divided into the following different groups: the coverage of the antenna of the first group may be a coverage of a horizontal angle from positive 5 degree to negative 5 degree and a vertical angle from positive 5 degree to negative 5 degree (i.e., +/−5° H and +/−5° V coverage), the coverage of the antenna of the second group may be a coverage of a horizontal angle from positive 5 degree to negative 5 degree and a vertical angle from positive 10 degree to negative 10 degree (i.e., +/−5° H and +/−10° V coverage), the coverage of the antenna of the third group may be a coverage of a horizontal angle from positive 10 degree to negative 10 degree and a vertical angle from positive 10 degree to negative 10 degree (i.e., +/−10° H and +/−10° V coverage), and so on.

In this way, assuming that the coverage of the antenna may be divided into N groups, which are listed as follows:

Group 1: +/−5° H, +/−5° V;
Group 2: +/−5° H, +/−10° V;
Group 3: +/−10° H, +/−10° V;
. . .
Group N−1: +/−40° H, 45° V;
Group N: +/−45° H, +/−45° V.

After dividing N groups, for each divided group, codebooks may be generated and aligned, and the generated codebooks may be stored in board data file in the memory of the AP. In this way, the plurality of codebooks may be generated for each AP and each codebook has a particular configuration of the plurality of antennas.

Figure 2:
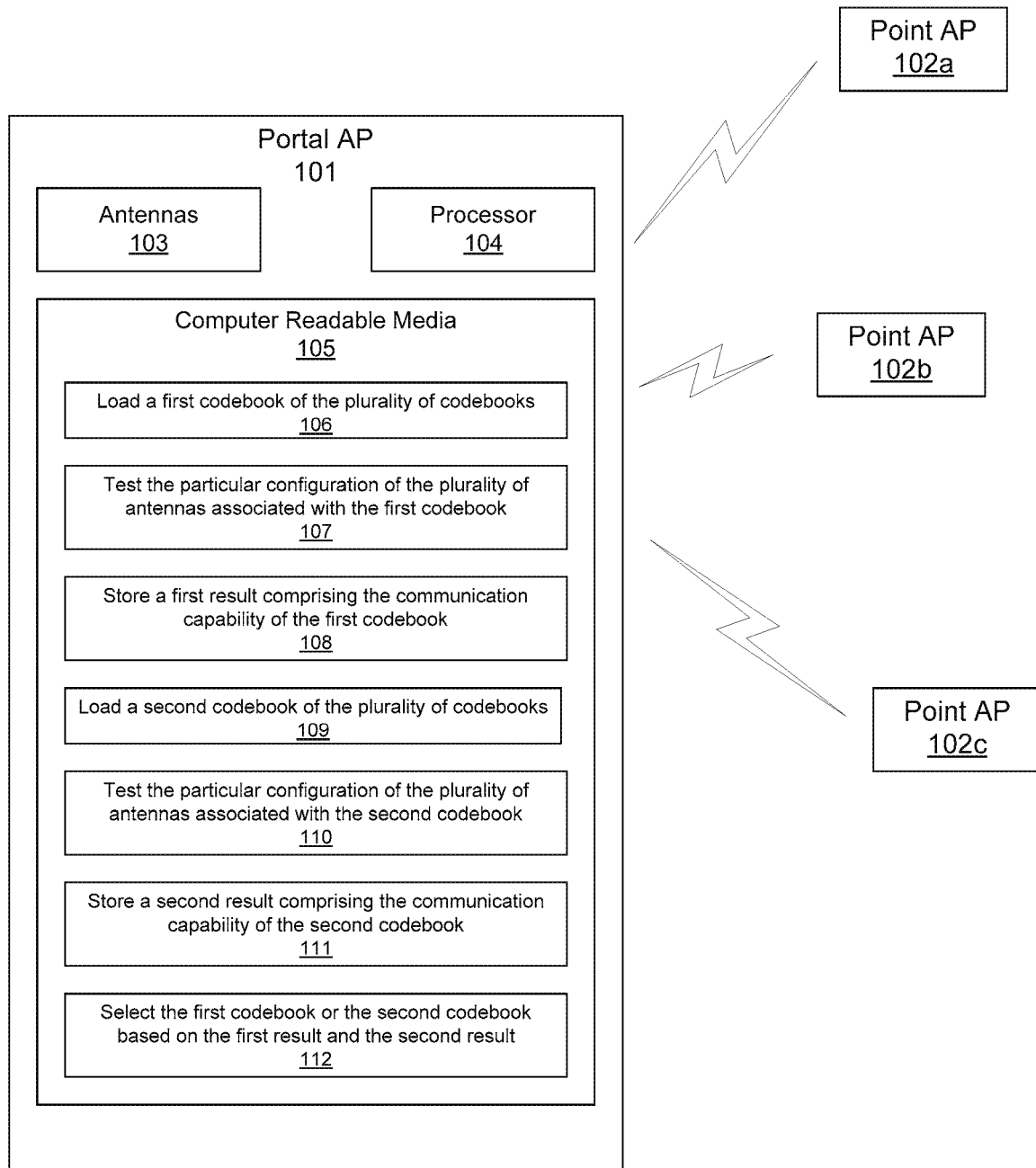
FIG. 2 is a diagram illustrating an example of automatically selecting a codebook according to present disclosure.

FIG. 2 is a diagram illustrating an example of AP according to present disclosure. The portal AP 101 is depicted as including a plurality of antennas 103, a processor 104 and a computer readable media 105. The point APs 102 may have similar features to the portal AP 101 and thus, the description of the portal AP 101 is intended to also pertain to the point APs 102, In addition, the AP 101 may wirelessly communicate with the point APs 102 via their respective antennas 103.

The processor 104 of the portal AP 101 may be any of a central processing unit (CPU), a semiconductor-based microprocessor, an application specific integrated circuit (ASIC), and/or other hardware device suitable for retrieval and execution of instructions stored in the computer readable medium 105. The processor 104 may fetch, decode, and execute instructions, such as the instructions 106-112 stored on the computer readable medium 105. The computer readable medium 105 may be a hardware device that is either programmed with instructions or otherwise stores instructions. For instance, the computer readable medium 105 may be a circuit component that is programmed with the instructions 106-112. In this example, the processor 104 and the computer readable medium 105 may be formed as an integrated circuit.

In another example, the computer readable medium 105 may be a machine readable storage medium, e.g., an electronic, magnetic, optical, or other physical storage device that contains or stores executable instructions. For instance, the computer readable medium 105 may be Random Access Memory (RAM), an Electrically Erasable Programmable Read-Only Memory (EEPROM), a storage device, an optical disc, or the like. In some implementations, the computer readable medium 105 may be a non-transitory machine-readable storage medium, where the term "non-transitory" does not encompass transitory propagating signals.

In any regard, the processor 104 may execute the instructions 106-112 to load a first codebook of the plurality of codebooks 106, test the particular configuration of the plurality of antennas associated with the first codebook 107, store a first result comprising the communication capability of the first codebook 108, load a second codebook of the plurality of codebooks 109, test the particular configuration of the plurality of antennas associated with the second codebook 110, store a second result comprising the communication capability of the second codebook 111, and select the first codebook or the second codebook based on the first result or the second result 120.

In one example, communication capabilities include a number of other network devices to which the network device is capable of connecting and a received signal strength indicator (RSSI) received from other network devices by the network device.

In the case that the network device is a portal AP 101, communication capabilities include a number of the point APs 102 to which the portal AP 101 is capable of connecting and RSSIs received from the point APs 102 by the portal AP 101.

In an example, testing the particular configuration of the plurality of antennas associated with the first codebook includes testing a first number of the point APs 102 to which the portal AP 101 is capable of connecting by using the particular configuration of the plurality of antennas associated with the first codebook of the portal AP 101. And testing the particular configuration of the plurality of antennas associated with the second codebook includes testing a second number of the point APs 102 to which the portal AP 101 is capable of connecting by using the particular configuration of the plurality of antennas associated with the second code book of the portal AP 101. Selecting the first codebook or the second codebook may include: comparing the first number with the second number, and selecting the first codebook when the first number is larger than the second number. Moreover, selecting the first codebook or the second codebook also may include: selecting the second codebook if the second number is larger than the first number.

In another example, testing the particular configuration of the plurality of antennas associated with the first codebook includes testing first RSSIs received from the point APs 102 by the portal AP 101 by using the particular configuration of the plurality of antennas associated with the first codebook of the portal AP 101. And testing the particular configuration of the plurality of antennas associated with the second codebook includes testing second RSSIs received from the point APs 102 by the portal AP 101 by using the particular configuration of the plurality of antennas associated with the second code book of the portal AP 101. Selecting the first codebook or the second codebook may include: comparing an average value of the first RSSIs with an average value of the second RSSIs, and selecting the first codebook when the average value of the first RSSIs is larger than the average value of the second RSSIs. And, if the average value of the second RSSIs is larger than the average value of the first RSSIs, the second codebook may be selected.

The above operation may be implemented before the network device was deployed or when the network device was deployed, and the network device may automatically select the codebook based on the testing result. Since there is not requirement for strict antenna alignment and manual selection when installing the portal AP, in this way, antenna performance may be maximized, and the installation of the network device may become simple, easy and reliable.

Figure 3:
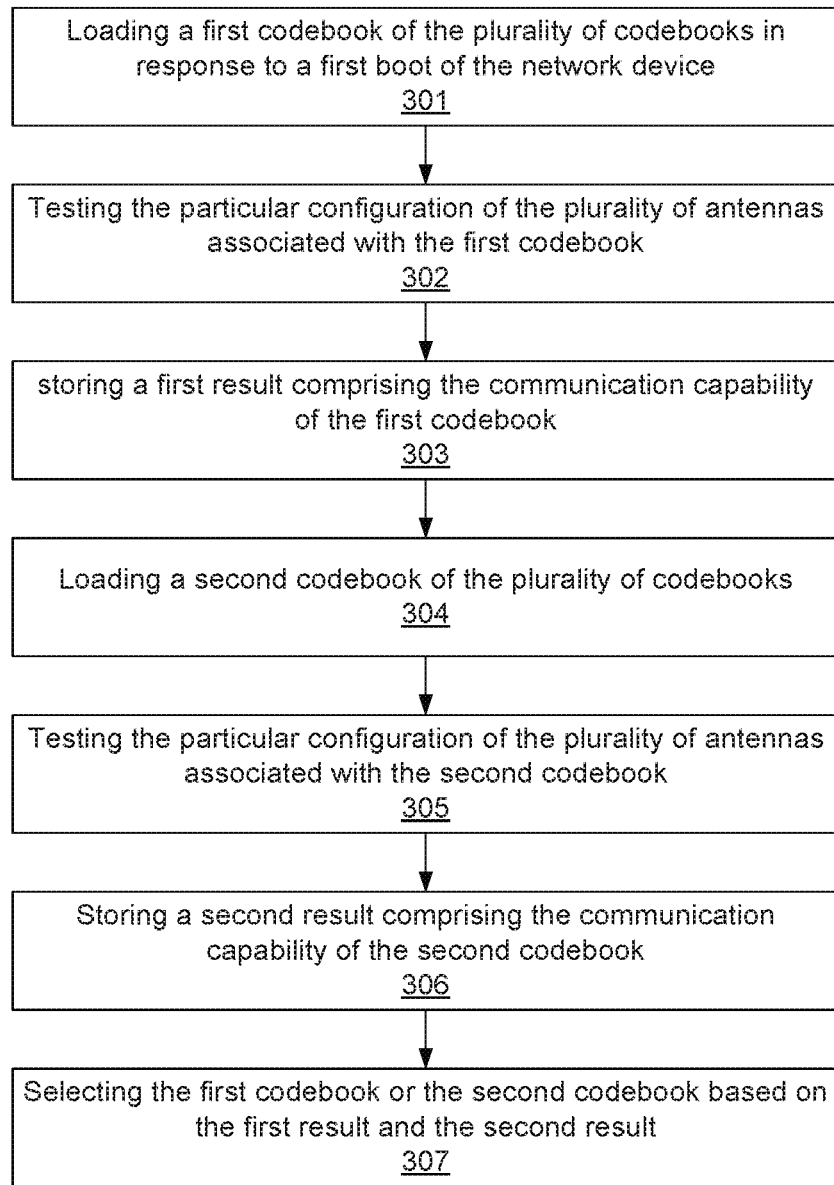
FIG. 3 is a flowchart of a method of selecting a codebook from a network device storing a plurality of codebooks.
Figure 4:
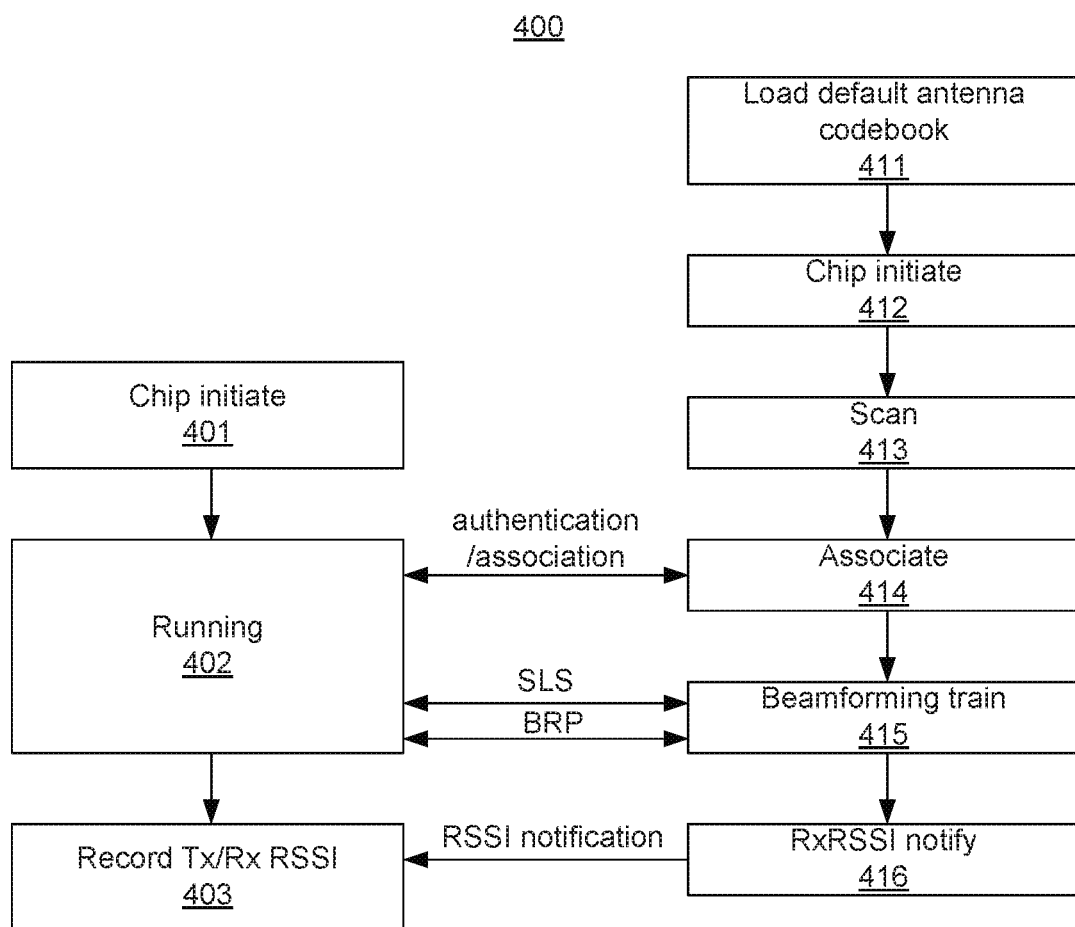
FIG. 4 is a diagram of testing a particular configuration of a plurality of antennas associated with a codebook.

Now referring to FIGS. 3 and 4. FIG. 3 is a flowchart of a method of selecting a codebook from a network device storing a plurality of codebooks. FIG. 4 is a diagram of testing a particular configuration of a plurality of antennas associated with a codebook.

As shown in FIG. 3, at step 301, the portal AP may load a first codebook of the plurality of codebooks in response to a first boot of the network device. The first codebook may be any one of the plurality of codebooks. Before loading the codebook, the plurality of codebooks stored in the portal AP 101 may be firstly ordered based on a predetermined rule. For example, the plurality of codebooks may be ordered in ascending order of a coverage range of a horizontal angle of the antennas or in descending order of a coverage range of a vertical angle of the antennas. And then, the first codebook in order may be selected as the first codebook.

At step 302, the portal AP 101 may test the particular configuration of the plurality of antennas associated with the first codebook. FIG. 4 is a diagram of testing the particular configuration of the plurality of antennas associated with the first codebook of the portal AP. The test may be used to obtain the communication capability of the first codebook, and the test includes the attempt of the portal AP 101 connecting to a plurality of point APs 102 and receiving RSSIs from the plurality of point APs 102.

As shown in FIG. 4, at the side of the AP 101, after loading the first codebook, at step 401, a chip may be initiated to run the portal AP 101. At step 402, the portal AP 101 may be run to complete connections with the point APs 102. This step may include the portal AP 101 authenticates the point APs 102 to be connect with, associate with the point APs 102 after the authentication is passed, and train beamforming based on sector level scan (SLS) and beamforming refinement protocol (BRP). The step also may include obtaining a number of the point APs 102 to which the AP 101 is capable of connecting. At step 403, the portal AP 101 may receive RSSIs from the point APs 102. The RSSIs may be sent by the point APs 102 to the portal AP 101 in the form of notification.

Meanwhile, at the side of the point APs 102, at step 411, each point AP 102 may load a default codebook. The default codebook may be preset. For example, a codebook to which a particular configuration of the plurality of antennas having a maximum coverage range of the horizontal angle corresponds may be regarded as the default codebook.

At step 412, each AP 102 may initiate its chip. The initiation is prepared for the following scanning, associating and beamforming training. At step 413, each AP 102 may scan to find whether there is a portal AP 101 to which the AP 102 may connect. When the AP 102 finds the portal AP 101, it may send an association request to the found portal AP 101, at step 414. After the portal AP 101 receives the association request, it may authenticate the point AP 102, and associate the point AP 102 after the authentication is passed, thereby completing the connection with the point AP 102, just like step 402. And then, at step 415, the point AP 102 and the portal AP 101 may train beamforming based on SLS and BRP. The point AP 102 and the portal AP 101 may communicate with each other by the trained beam. At last, at step 416, the point AP 102 may send a RSSI to the portal AP 101. The RSSI may be sent by the point AP 102 in the form of notification.

Returning to FIG. 3, at step 303, the portal AP 101 may regard a number of the point APs 102 to which the portal AP 101 is capable of connecting as a first number, and may regard RSSIs received from the point APs 102 by the portal AP 101 as first RSSIs. And then, the portal AP 101 may store a first result including the first number and the first RSSIs.

At step 304, the portal AP may load a second codebook of the plurality of codebooks. The second codebook may be any one of the plurality of codebooks. If the plurality of codebooks stored in the portal AP 101 have be ordered, the second codebook in order is selected as the second codebook.

At step 305, the AP 101 may test the particular configuration of the plurality of antennas associated with the second codebook. This step is similar to step 302.

At step 306, the portal AP 101 may regard a number of the point APs 102 to which the portal AP 101 is capable of connecting as a second number, and may regard RSSIs received from the point APs 102 by the portal AP 101 as second RSSIs. And then, the portal AP 101 may store a second result including the second number and the second RSSIs.

At step 307, the first codebook or the second codebook is selected based on the first result or the second result.

In this step, the first codebook or the second codebook may be selected based on the number of the point APs 102 to which the portal AP 101 is capable of connecting. For example, when the first number is larger than the second number, the first codebook may be selected as the codebook suitable for the current scenario. Conversely, the second codebook may be selected as the codebook suitable for the current scenario.

In addition, the first codebook or the second codebook also may be selected based on the RSSIs received from the point APs 102 by the portal AP 101. Since the portal AP 101 may be connected to several point APs 102, the RSSIs received from the point APs 102 by the portal AP 101 may be more than one RSSI. In this situation, an average value of the RSSIs may be firstly calculated, and then the first codebook or the second codebook may be selected based on the average value. For example, the portal AP 101 may calculate an average value of the first RSSIs and an average value of the second RSSIs. Next, the portal AP 101 may compare the average value of the first RSSIs and the average value of the second RSSIs, and if the average value of the first RSSIs is larger than the average value of the second RSSIs, the first codebook may be selected as the codebook of the portal AP 101 for the current scenario. Conversely, the second codebook may be selected as the codebook of the portal AP 101 for the current scenario.

The above is the explanation of the test process of portal AP 101. Next, a test process of a point AP 102 will be described. Now, returning to FIG. 3. FIG. 3 also may be used as a flowchart of a method of selecting a codebook from a point AP 102.

At step 301, the point AP 102 may load a first codebook of the plurality of codebooks in response to a first boot of the network device. The first codebook may be any one of the plurality of codebooks. The plurality of codebooks stored in the point AP 102 may be ordered based on a predetermined rule and the first codebook in order may be selected as the first codebook.

At step 302, the point AP 102 may test the particular configuration of the plurality of antennas associated with the first codebook. In this step, the portal AP 101 may load a codebook selected by performing the above steps 301-307, and the selected codebook of the portal AP 101 may not be changed in the test process of the point AP 102.

Next, at the side of the portal AP 101, the portal AP 101 may perform steps 401-403, as described above. And at the side of the point AP 102, the point AP 102 may perform steps 412-416. And after the point AP 102 connected with the portal AP 101, the portal AP 101 may send a RSSI to the point AP 102. The RSSI may be sent by the portal AP 101 in the form of notification.

At step 303, the point AP 102 may regard a number of the portal AP 101 to which the point AP 102 is capable of connecting as a first number, and may regard a RSSI received from the portal AP 101 by the point AP 102 as a first RSSI. And then, the point AP 102 may store a first result including the first number and the first RSSI.

At steps 304-306, the point AP 102 may load a second codebook of the plurality of codebooks, test the particular configuration of the plurality of antennas associated with the second codebook, and may receive a RSSI from the portal AP 101. And then, the point AP 102 may regard a number of the portal AP 101 to which the point AP 102 is capable of connecting as a second number, and may regard the RSSI received from the portal AP 101 by the point AP 102 as a second RSSI. And then, the point AP 102 may store a second result including the second number and the second RSSI.

It is noted that since the point AP 102 is a client mode AP, it connects with the portal AP 101 and does not connect with other point APs 102. As a result, the number of the portal AP 101 to which the point AP 102 is capable of connecting is 1 or 0. Thus, when the point AP 102 selects a codebook, it selects the codebook based on the RSSI received from the portal AP 101 by the point AP 102, but not the number of the portal AP 101 to which the point AP 102 is capable of connecting.

At step 307, the point AP 102 may select the first codebook or the second codebook based on the first RSSI or the second RSSI. For example, if the first RSSI is larger than the second RSSI, the first codebook may be selected. Conversely, the second codebook may be selected.

A process of selecting a codebook is described above. This process may be implemented before the network devices including the portal AP 101 and the point APs 102 were deployed or when the network devices were deployed, and this process may cause the network devices to automatically select the codebook. Since there is not requirement for strict antenna alignment and manual selection when installing the network devices, in this way, antenna performance may be maximized, and the installation of the network device may become simple, easy and reliable.

Even though the above examples have described that each AP may load two codebooks, i.e., the first codebook and the second codebook, to test the particular configurations of the plurality of antennas associated with the two codebooks, and may select the codebook based on the testing results, the invention is not limited thereto. In fact, each AP may load three or more codebooks to test, and may select the codebook based on three or more testing results.

For example, each AP may load k codebooks, wherein k is an integer, and k is larger than or equals to 3 and is smaller than or equals to N. N is the total number of the codebooks stored in the APs. In this situation, the APs may perform steps 302-304 cyclically, until all of k codebooks has been loaded, the particular configuration of the plurality of antennas associated with each codebook of k codebooks has been tested, and k results comprising the communication capabilities of k codebooks has been stored. And then, the APs may select a codebook based on k results.

For example, if the result includes a number of the point APs 102 to which the portal AP 101 is capable of connecting, the codebook corresponding to the largest number of the point APs 102 to which the portal AP 101 is capable of connecting may be selected. For another example, if the result includes RSSIs received from the point APs 102 by the portal 101, the codebook corresponding to the largest average of the RSSIs received from the point APs 102 by the portal 101 may be selected. Or, if the result includes a RSSI received from the portal AP 101 by the point AP 102, the codebook corresponding to the largest RSSI received from the portal AP 101 by the point AP 102 may be selected.

Besides the above method described, a codebook suitable for the current scenario also may be selected based on the relative positions of the APs.

FIG. 5 is a flowchart of selecting a codebook based on the relative positions of the APs. As shown in FIG. 5, at the side of the portal AP 101, it may receive coordinate information from a GPS module, at step 501. The GPS module may be installed on the portal AP 101, or may be separate from portal AP 101. The GPS module is used to obtain the coordinate information (geographical coordinates) of the portal AP 101.

At step 502, the portal AP 101 may determine relative positions of the portal AP 101 with respect to the point APs 102 based on their coordinate information. The relative positions may include horizontal angles, vertical angles or distances. In this step, the portal AP 101 may firstly receive the coordinate information of the point APs 102, and then, may calculate horizontal angles, vertical angles or distances with respect to the point APs 102 based on the received coordinate information of the point APs 102. The coordinate information of the point APs 102 may be obtained by GPS modules of the point APs 102.

At step 503, the portal AP 101 may select a codebook from the above divided Group based on the calculated horizontal angles, vertical angles or distances. The codebook may be cover these calculated horizontal angles, vertical angles or distances and may have the smallest coverage range.

For example, referring to FIG. 1, the portal AP 101 may connects to the point AP 102a, the point AP 102b, and the point AP 102c, The portal AP 101 may calculate horizontal angles and vertical angles with respect to the point AP 102a, the point AP 102b, and the point AP 102c. If the calculated horizontal angle and the calculated vertical angle with respect to the point AP 102a are +5° H and +10° V, the calculated horizontal angle and the calculated vertical angle with respect to the point AP 102b are +10° H and +10° V, and the calculated horizontal angle and the calculated vertical angle with respect to the point AP 102c are −10° H and −5° V, then a codebook corresponding to the above Group 3 may be selected as the codebook suitable for the current scenario, since Group 3 (+/−10 H, +/−10° V) covers these calculated horizontal angles and vertical angles (+5° H and +10° V, +10° H and +10° V, and −10° H and −5° V), and has the smallest coverage range.

At the side of the point APs 102, they may also implement steps 501-503 to select a codebook for themselves. At step 501, the point APs 102 may receive coordinate information from their respective GPS modules.

At step 502, the point APs 102 may determine relative positions with respect to the portal AP 101 based on the coordinate information. In the case that vertical angles of the point APs 102 have been aligned, the coordinate information may include horizontal angles. Thus, the point APs 102 may calculate horizontal angles with respect to the portal AP 101.

At step 503, the point APs 102 may select a codebook from the divided Group above based on the calculated horizontal angles. If the calculated horizontal angle of the point AP 102a with respect to the portal AP 101 is +5° H, then the point AP 102a may select a codebook corresponding to the above Group 1 (+/−5° H, +/−5° V) as the codebook suitable for the current scenario, since Group 1 covers the calculated horizontal angle and has the smallest coverage range.

Figure 6:
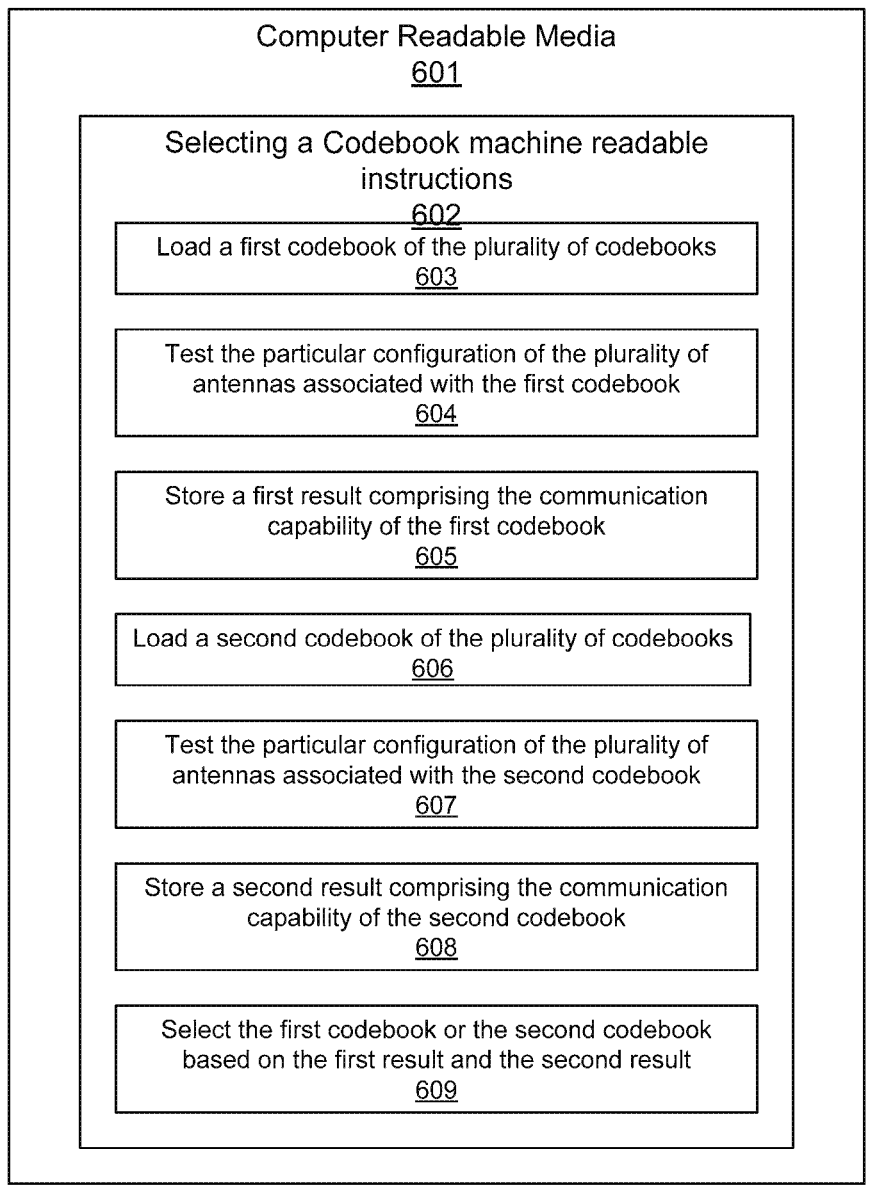
FIG. 6 is schematic representation of a computer readable medium, according to an example of the present disclosure.

FIG. 6 is schematic representation of a computer readable medium, according to an example of the present disclosure. Turning now to FIG. 6, there is shown a schematic representation 600 of a computer readable medium 601, according to an example of the present disclosure. The computer readable medium 601 may be any suitable medium that participates in providing instructions to a processor (not shown) for execution. For example, the computer readable medium 601 may be non-volatile media, such as an optical or a magnetic disk; volatile media, such as memory. The computer-readable medium 601 may also store selecting a codebook machine readable instructions 602, which, when executed may cause the processor to perform some or all of the methods 300 and 400 depicted in FIGS. 3 and 4. In this regard, the machine readable instructions 602 may include instructions to load a first codebook of the plurality of codebooks in response to a first boot of the network device 603, instructions to test the particular configuration of the plurality of antennas associated with the first codebook 604, instructions to store a first result comprising the communication capability of the first codebook 605, instructions to load a second codebook of the plurality of codebooks 606, instructions to test the particular configuration of the plurality of antennas associated with the second codebook 607, instructions to store a second result comprising the communication capability of the second codebook 608, and instructions to select the first codebook or the second codebook based on the first result or the second result 609.

In one example, communication capabilities include a number of other network devices to which the network device is capable of connecting and a RSSI received from other network devices by the network device.

In the case that the network device is a portal AP 101, communication capabilities include a number of the point APs 102 to which the portal AP 101 is capable of connecting and RSSIs received from the point APs 102 by the portal AP 101.

In an example, testing the particular configuration of the plurality of antennas associated with the first codebook includes testing a first number of the point APs 102 to which the portal AP 101 is capable of connecting by using the particular configuration of the plurality of antennas associated with the first codebook of the portal AP 101. And testing the particular configuration of the plurality of antennas associated with the second codebook includes testing a second number of the point APs 102 to which the portal AP 101 is capable of connecting by using the particular configuration of the plurality of antennas associated with the second code book of the portal AP 101. Selecting the first codebook or the second codebook includes: comparing the first number with the second number, and selecting the first codebook when the first number is larger than the second number. And, if the second number is larger than the first number, the second codebook is selected.

In another example, testing the particular configuration of the plurality of antennas associated with the first codebook includes testing first RSSIs received from the point APs 102 by the portal AP 101 by using the particular configuration of the plurality of antennas associated with the first codebook of the portal AP 101. And testing the particular configuration of the plurality of antennas associated with the second codebook includes testing second RSSIs received from the point APs 102 by the portal AP 101 by using the particular configuration of the plurality of antennas associated with the second code book of the portal AP 101, Selecting the first codebook or the second codebook includes: comparing an average value of the first RSSIs with an average value of the second RSSIs, and selecting the first codebook when the average value of the first RSSIs is larger than the average value of the second RSSIs. And, if the average value of the second RSSIs is larger than the average value of the first RSSIs, the second codebook is selected.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the

What is claimed is:

1. A network device comprising:
a plurality of antennas;
a processor; and
a non-transitory computer readable medium storing a plurality of codebooks, each of the plurality of codebooks comprising instructions to test communication capabilities of the network device using a particular configuration of the plurality of antennas,
in response to a first boot of the network device, the processor causing the network device to:
load a first codebook of the plurality of codebooks;
test the particular configuration of the plurality of antennas associated with the first codebook;
store a first result comprising the communication capability of the first codebook;
receive coordinate information from a GPS module;
determine relative positions of other network devices;
identify, based on the relative positions, a second codebook of the plurality of codebooks;
load the second codebook of the plurality of codebooks;
test the particular configuration of the plurality of antennas associated with the second codebook;
store a second result comprising the communication capability of the second codebook;
select the first codebook or the second codebook based on the first result or the second result.

2. The network device of claim 1, wherein communication capabilities include a number of other network devices to which the network device is capable of connecting and a received signal strength indicator (RSSI) received from other network devices by the network device.

3. The network device of claim 2, wherein testing the particular configuration of the plurality of antennas associated with the first codebook includes testing a first number of other network devices to which the network device is capable of connecting by using the particular configuration of the plurality of antennas associated with the first codebook, and
wherein testing the particular configuration of the plurality of antennas associated with the second codebook includes testing a second number of other network devices to which the network device is capable of connecting by using the particular configuration of the plurality of antennas associated with the second codebook.

4. The network device of claim 3, wherein selecting the first codebook or the second codebook includes:
selecting the first codebook when the first number is larger than the second number, or
selecting the second codebook when the second number is larger than the first number.

5. The network device of claim 2, wherein testing the particular configuration of the plurality of antennas associated with the first codebook includes testing a first RSSI received from other network devices by the network device by using the particular configuration of the plurality of antennas associated with the first codebook, and
wherein testing the particular configuration of the plurality of antennas associated with the second codebook includes testing a second RSSI received from other network devices by the network device by using the particular configuration of the plurality of antennas associated with the second codebook.

6. The network device of claim 5, wherein selecting the first codebook or the second codebook includes:
selecting the first codebook when the first RSSI is larger than the second RSSI, or
selecting the second codebook when the second RSSI is larger than the first RSSI.

7. The network device of claim 5, wherein the plurality of codebooks stored in the network device are ordered based on a predetermined rule.

8. A method of selecting a codebook from a network device storing a plurality of codebooks, wherein the network device comprises a plurality of antennas and a particular configuration of the plurality of antennas is used to test communication capabilities of the network device, the method including:
loading a first codebook of the plurality of codebooks in response to a first boot of the network device;
testing the particular configuration of the plurality of antennas associated with the first codebook;
storing a first result comprising the communication capability of the first codebook;
receiving coordinate information from a GPS module;
determining relative positions of other network devices;
identifying, based on the relative positions, a second codebook of the plurality of codebooks;
loading the second codebook of the plurality of codebooks;
testing the particular configuration of the plurality of antennas associated with the second codebook;
storing a second result comprising the communication capability of the second codebook;
selecting the first codebook or the second codebook based on the first result or the second result.

9. The method of claim 8, wherein communication capabilities include a number of other network devices to which the network device is capable of connecting and a received signal strength indicator (RSSI) received from other network devices by the network device.

10. The method of claim 9, wherein testing the particular configuration of the plurality of antennas associated with the first codebook includes testing a first number of other network devices to which the network device is capable of connecting by using the particular configuration of the plurality of antennas associated with the first codebook, and
wherein testing the particular configuration of the plurality of antennas associated with the second codebook includes testing a second number of other network devices to which the network device is capable of connecting by using the particular configuration of the plurality of antennas associated with the second codebook.

11. The method of claim 10, wherein selecting the first codebook or the second codebook includes:
selecting the first codebook when the first number is larger than the second number, or
selecting the second codebook when the second number is larger than the first number.

12. The method of claim 9, wherein testing the particular configuration of the plurality of antennas associated with the first codebook includes testing a first RSSI received from other network devices by the network device by using the particular configuration of the plurality of antennas associated with the first codebook, and
wherein testing the particular configuration of the plurality of antennas associated with the second codebook includes testing a second RSSI received from other network devices by the network device by using the particular configuration of the plurality of antennas associated with the second codebook.

13. The method of claim 12, wherein selecting the first codebook or the second codebook includes:
selecting the first codebook when the first RSSI is larger than the second RSSI, or
selecting the second codebook when the second RSSI is larger than the first RSSI.

14. The method of claim 12, wherein the plurality of codebooks stored in the network device are ordered based on a predetermined rule.

15. A non-transitory computer readable storage medium storing a plurality of codebooks, each of the plurality of codebooks comprising instructions to test communication capabilities of a network device using a particular configuration of the plurality of antennas, the instructions that, when executed by a processor of the network device, causes the processor to:
load a first codebook of the plurality of codebooks in response to a first boot of the network device;
test the particular configuration of the plurality of antennas associated with the first codebook;
store a first result comprising the communication capability of the first codebook;
receive coordinate information from a GPS module;
determine relative positions of other network devices;
identify, based on the relative positions, a second codebook of the plurality of codebooks;
load the second codebook of the plurality of codebooks;
test the particular configuration of the plurality of antennas associated with the second codebook;
store a second result comprising the communication capability of the second codebook;
select the first codebook or the second codebook based on the first result or the second result.

16. The non-transitory computer readable storage medium of claim 15, wherein communication capabilities include a number of other network devices to which the network device is capable of connecting and a received signal strength indicator (RSSI) received from other network devices by the network device.

17. The non-transitory computer readable storage medium of claim 16, wherein testing the particular configuration of the plurality of antennas associated with the first codebook includes testing a first number of other network devices to which the network device is capable of connecting by using the particular configuration of the plurality of antennas associated with the first codebook, and
wherein testing the particular configuration of the plurality of antennas associated with the second codebook includes testing a second number of other network devices to which the network device is capable of connecting by using the particular configuration of the plurality of antennas associated with the second codebook.

18. The non-transitory computer readable storage medium of claim 17, wherein selecting the first codebook or the second codebook includes:
selecting the first codebook when the first number is larger than the second number, or
selecting the second codebook when the second number is larger than the first number.

19. The non-transitory computer readable storage medium of claim 16, wherein testing the particular configuration of the plurality of antennas associated with the first codebook includes testing a first RSSI received from other network devices by the network device by using the particular configuration of the plurality of antennas associated with the first codebook, and
wherein testing the particular configuration of the plurality of antennas associated with the second codebook includes testing a second RSSI received from other network devices by the network device by using the particular configuration of the plurality of antennas associated with the second codebook.

20. The non-transitory computer readable storage medium of claim 19, wherein selecting the first codebook or the second codebook includes:
selecting the first codebook when the first RSSI is larger than the second RSSI, or
selecting the second codebook when the second RSSI is larger than the first RSSI.

* * * * *